(12) United States Patent
Lescostaouec

(10) Patent No.: US 8,074,330 B2
(45) Date of Patent: Dec. 13, 2011

(54) METHOD AND SYSTEM FOR ENABLING Z FIBER TRANSFER IN NEEDLED PREFORM

(75) Inventor: Jean-Francois Lescostaouec, Pueblo West, CO (US)

(73) Assignee: Goodrich Corporation, Charlotte, NC (US)

( * ) Notice: Subject to any disclaimer, the term of this patent is extended or adjusted under 35 U.S.C. 154(b) by 305 days.

(21) Appl. No.: 12/536,649

(22) Filed: Aug. 6, 2009

(65) Prior Publication Data

US 2010/0037441 A1 Feb. 18, 2010

Related U.S. Application Data

(60) Provisional application No. 61/088,407, filed on Aug. 13, 2008.

(51) Int. Cl.
*D04H 3/10* (2006.01)
*D04H 5/02* (2006.01)

(52) U.S. Cl. ............... 28/107; 28/112; 28/170

(58) Field of Classification Search ............ 28/107–115, 28/170, 143, 163; 264/29.2, 29.1; 427/249.3, 427/249.1; 156/148; 65/112
See application file for complete search history.

(56) References Cited

U.S. PATENT DOCUMENTS

| | | | | |
|---|---|---|---|---|
| 2,741,824 A | * | 4/1956 | Robbins, II et al. | 428/131 |
| 3,908,057 A | * | 9/1975 | Smith, II | 428/151 |
| 5,203,059 A | * | 4/1993 | Olry et al. | 28/107 |
| 5,217,770 A | * | 6/1993 | Morris et al. | 428/36.3 |
| 5,323,523 A | * | 6/1994 | Lawton et al. | 29/419.1 |
| 5,546,880 A | * | 8/1996 | Ronyak et al. | 112/475.01 |
| 5,609,707 A | * | 3/1997 | Bazshushtari et al. | 156/148 |
| 5,952,075 A | | 9/1999 | Clarke et al. | |
| 6,009,605 A | | 1/2000 | Olry et al. | |
| 6,248,471 B1 | | 6/2001 | Lake | |
| 6,367,130 B1 | * | 4/2002 | Duval et al. | 28/107 |
| 6,767,602 B1 | * | 7/2004 | Duval et al. | 428/36.1 |
| 2002/0172795 A1 | * | 11/2002 | Gardner et al. | 428/85 |
| 2006/0204712 A1 | * | 9/2006 | Gardner et al. | 428/95 |

FOREIGN PATENT DOCUMENTS

CA 2238835 6/1997

* cited by examiner

*Primary Examiner* — Amy Vanatta
(74) *Attorney, Agent, or Firm* — Snell & Wilmer L.L.P.

(57) ABSTRACT

A method for preparing a needled preform comprises transporting, cutting and needling a textile tape. The method further comprises cutting through a portion of the textile tape with a cutting device. The textile tape remains substantially contiguous after the cutting. The method further comprises needling the textile tape into a needled preform after cutting the textile tape, and the needling utilizes needles having working surfaces oriented in a direction to transfer fiber segments from a selected fiber orientation into a z-direction. In an embodiment, a system for enabling z-fiber transfer in a textile tape comprises a textile support configured to transport the textile tape, a cutting device configured to cut a portion of the textile tape, and a needling device configured to needle the textile tape into a needled preform after the cutting device cuts the textile tape.

20 Claims, 10 Drawing Sheets

METHOD AND SYSTEM FOR ENABLING Z FIBER TRANSFER IN NEEDLED PREFORM

CROSS-REFERENCE TO RELATED APPLICATIONS

This application claims priority to, and the benefit of, U.S. Provisional Ser. No. 61/088,407 filed Aug. 13, 2008, which is incorporated herein by reference.

FIELD OF THE INVENTION

The present invention relates generally to the manufacture of composite materials and parts. More particularly, the invention relates to a method and system for facilitating the transfer of fiber in a z direction in association with the fabrication of a needled preform.

BACKGROUND OF THE INVENTION

Carbon/carbon ("C/C") parts are employed in various industries. An exemplary use for carbon/carbon parts is fabricating them in the form of friction disks such as aircraft brake disks, race car brake disks, and clutch disks. C/C brake disks are especially useful in such applications because of the superior high temperature characteristics of C/C material. In particular, the C/C material used in C/C parts is a good conductor of heat and the C/C material is able to dissipate heat away from the braking surfaces that is generated in response to braking. C/C material is also highly resistant to heat damage, and is thus capable of sustaining friction between brake surfaces during severe braking without a significant reduction in the friction coefficient or mechanical failure.

C/C material is generally formed by utilizing continuous oxidized polyacrylonitrile (PAN) fibers, referred to as "OPF" fibers. These OPF fibers are the precursors of carbonized PAN fibers and are used to fabricate a preformed shape using a needle punching process. OPF fibers are layered in a selected orientation into a preform of a selected geometry. Typically, two or more layers of fibers are layered onto a support and are then needled together simultaneously or in a series of needling steps. This process interconnects the horizontal fibers with a third direction also called the z-direction, and the fibers extending into the third direction are also called z-fibers. This needling process may involve driving a multitude of barbed needles into the fibrous layers to displace a portion of the horizontal fibers into the z-direction. Transport of the fibers by the barbed needles is a function of several parameters including barb geometry, barb position with respect to the orientation of the fibers, needle penetration depth and fiber characteristics. Fibers presenting a high modulus like carbon fibers may be difficult to transport in the z-direction as they may break under the action of the needles. The polymeric nature of the OPF fibers facilitates the transport of the low modulus fibers in the z direction. Controlling the degree of transport in the z-direction and the distribution of z-fibers may be important steps in the production of a preform.

After the needling process is complete, the OPF fibers are generally carbonized at high temperatures in a controlled environment to transform the preform into a high carbon content substrate. Following this batch operation, the resulting fibrous carbon substrate is densified through chemical vapor deposition of pyrolytic carbon until the composite reaches the desired density level.

Alternatively, and to eliminate or reduce the costly and lengthy carbonization step, the fibrous preform may be prepared directly from carbonized carbon fibers or from stabilized carbon precursor such as stabilized pitch fibers. Carbonized carbon fibers are readily commercially available in substantially continuous tow forms from a wide number of suppliers and possess desirable higher thermal and mechanical properties than the transformed OPF fibers. Stabilized pitch fibers are also commercially available and have potential to further increase the final composite thermal properties. Additionally, other inorganic fibers such as those prepared with a ceramic precursor may be available as well. Such fibers, however, exhibit a high modulus and are much more difficult to transport in a substantially continuous tow form in the z-direction with barbed needles.

For example, large lengths of carbonized fibers, when constrained at both ends, will generally break under a downward movement of the barbed needles rather than being transported into the preform like PAN/OPF fibers. Alternatively, short lengths of pre-cut carbonized fibers may be added in the form of loose fibers or a web. Loose fibers are not amenable to a well controlled production process and a web of suitable geometry may not be readily commercially available. In addition, a preform prepared with a high number of short length fibers may exhibit low strength.

Therefore, a method for increasing the amount of displaced fibers into the z-direction from a starting, substantially continuous textile is desired.

SUMMARY OF THE INVENTION

Methods and systems for forming a substantially contiguous fiber textile feedstock are disclosed. The feedstock may comprise continuous and/or discontinuous long and short length fibers organized in a pre-determined fiber architecture.

In an embodiment, a method for preparing a needled preform comprises transporting, cutting and needling a textile tape. The textile tape has substantially continuous textile fibers, and the textile tape is defined by a width and a thickness. The method further comprises cutting through at least one of a portion of the width of the textile and a portion of the thickness of the textile tape. The textile tape remains substantially contiguous after the cutting. The method further comprises needling the textile tape into a needled preform after cutting the textile tape.

Further, in an embodiment, a method for enabling z-fiber transfer in feeding textile comprises transporting, cutting and needling a textile tape, where the textile tape comprises substantially continuous textile fibers. The textile tape is formed of substantially pure carbon fibers, and the textile tape is defined by a width and a thickness. The method further comprises cutting through at least one of a portion of the width of the textile tape and a portion of the thickness of the textile tape with a laser cutting device. After cutting, the textile tape remains substantially contiguous. The method further comprises needling the textile tape having fiber segments into a needled preform. The needling utilizes needles having working surfaces oriented in a direction to transfer fiber segments from a selected fiber orientation into a z-direction.

In an embodiment, a system for enabling z-fiber transfer in a textile tape comprises a textile support configured to transport the textile tape, where the textile tape comprises a plurality of substantially continuous fibers, and the textile tape is defined by a width and a thickness. The system further comprises a cutting device configured to cut at least one of a portion of the width of the textile tape and a portion of the thickness of the textile tape. The textile tape remains substantially contiguous after being cut. The method further comprises a needling device configured to needle the textile tape into a needled preform after the cutting device cuts the textile tape.

Various embodiments are configured to provide a net shape annular needled preform from a substantially continuous helical carbon tape. This technology may be applicable to the preparation of needled annular preforms from various textile compositions such as yarns held in an organized fiber architecture using mechanical or bonded devices, pre-cut textile sectors, or pre-cut annular textiles. This technology may also be applicable to the formation of needled preforms in the form of rectangular boards. In such an embodiment, the transport of the textile is conducted over cylinders.

Other systems, methods, features and advantages are, or will become, apparent to one with skill in the art upon examination of the following figures and detailed description. It is intended that all such additional systems, methods, features and advantages be included within this description, be within the scope of the examples, and be protected by the following claims and be defined by the following claims. Further aspects and advantages are discussed below in conjunction with the description.

BRIEF DESCRIPTION OF THE DRAWING FIGURES

The system and/or method may be better understood with reference to the following drawing figures and description. Non-limiting and non exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified.

DETAILED DESCRIPTION

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical, electrical, and mechanical changes may be made without departing from the spirit and scope of the invention. Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

Various embodiments of the disclosed system and method will now be described with reference to the appended figures, in which like reference labels are used to refer to like components throughout. The appended figures are not necessarily to scale. As used herein, the singular forms "a," "an," and "the" include plural referents unless the context clearly dictates otherwise. As used herein, the terms "for example," "for instance," "such as," or "including" are meant to introduce examples that further clarify more general subject matter. Unless otherwise specified, these examples are present disclosure, and are not meant to be limiting in any fashion.

Figure 1:
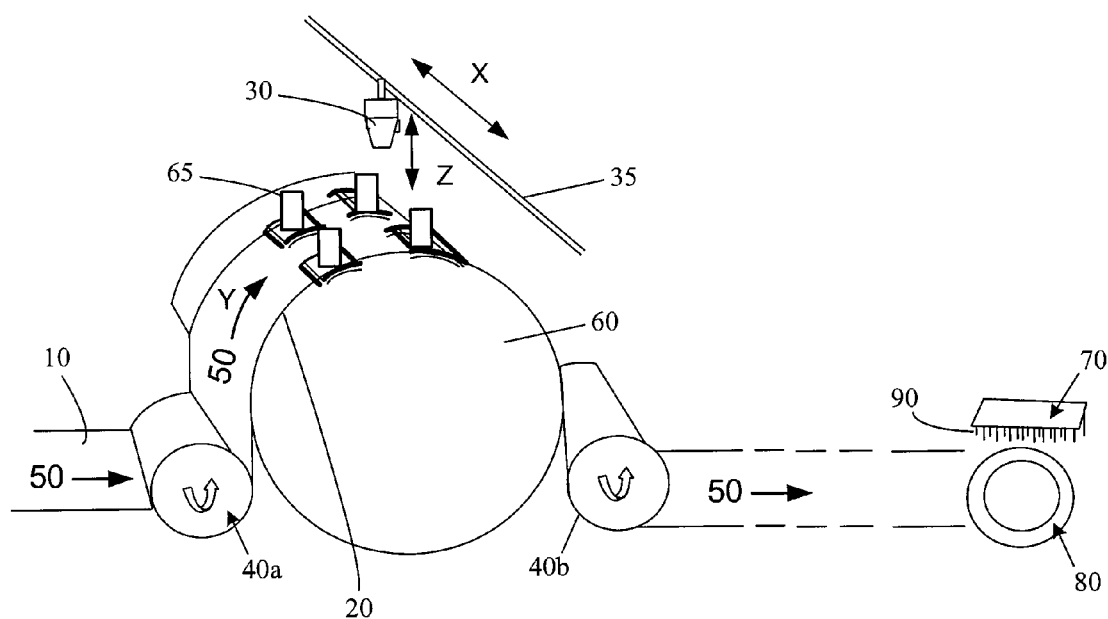
FIG. 1 illustrates a side view of a system for selectively cutting fiber segments at a surface of a textile tape for enabling z transport during needling of a preform according to an embodiment.
Figure 4:
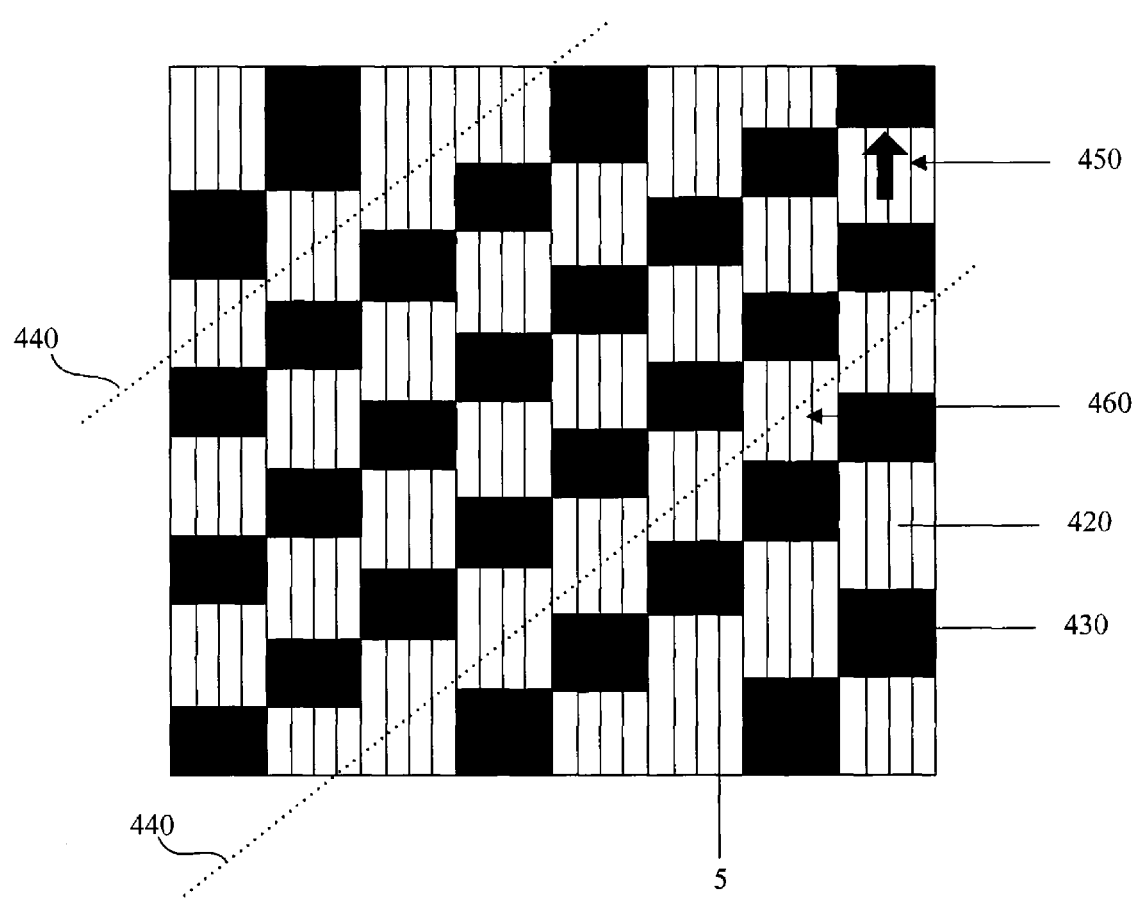
FIG. 4 illustrates a cross-section view of a surface of a twill woven fabric with depicted selective cut lines of warp fibers according to an embodiment.

According to an embodiment, FIG. 1 illustrates a system for cutting fibers within a fiber helical textile tape (e.g., continuously and/or selectively cutting fibers). The tape may be subsequently fed into a needle punch loom to be needled into a preform. The tape may further be stored on a suitable storing device before being fabricated into a preform. As shown in FIG. 1, a textile tape 10 is transported along the surface of a conical feeding cone from textile system 100 in a direction of movement 50 referred to as a machine direction. The textile tape 10 is transported within a cutting distance of a cutting device 30 through the feeding and positioning cone of the textile system 100 so that the cutting device 30 may selectively cut the textile tape 10. Textile tape 10 is composed of substantially continuous fibers 5 (as shown in FIG. 4) aligned substantially in parallel with one another in a first direction, generally referred to as a machine direction.

In an embodiment, carbon fibers are used and are aligned in the machine direction 50. Generally, carbon fibers having above about 90 wt % carbon composition may be considered to be pure or substantially pure carbon fibers. Carbon fibers having a composition of carbon below about 90 wt % may be pre-carbonized or fully carbonized carbon fibers. Both types of carbon fibers may be used in the present description. In various embodiments, substantially pure carbon fibers may be used.

According to various embodiments, any textile comprised of fibers may be used. Types of textile fibers may include, but are not limited to, oxidized polyacrylonitrile (PAN) fibers (which may hereinafter be referred to as "OPF"), carbonized PAN fibers, stabilized pitch fibers, ceramic precursor fibers, substantially pure carbon fibers or other suitable materials may be used.

These types of fibers are generally commercially available in various forms, including tows, yarns, woven and non-woven fabrics, knit fabrics and felts. As used herein the terms "tow" and "cable" are used to refer to a strand of substantially continuous filaments. As used herein, the term "yarn" is used to refer to a strand of substantially continuous fibers or staple fibers or blends of these; thus the term "yarn" encompasses tow and cable. In one example, a "heavy tow" may comprise about 50,000 textile fibers in a single tow. In another example, a "lighter tow" may comprise about 12,000 textile fibers within a single tow. Fewer or greater amounts of textile fibers 5 may be used per cable in various embodiments.

Textile fibers 5 may be overlapped or interlaced through a weaving technology, and the textile fibers 5 may be overlapped or interlaced onto one another at an angle (for example, as shown in FIG. 4). Any angle which allows at least two textile fibers to overlap or interlace may be used. In various embodiments, the angle of overlap may vary from zero to ninety degrees with the textile fibers 5 having a non-uniform angled distribution. For example, textile fibers 5 may overlap at different or similar angles along the textile tape 10. Textile fibers 5 also include tows in separate planes to achieve a non-crimp fabric. Such configurations may be accomplished by derivatives of warp knitting technologies, including stitch bonding.

In various embodiments, textile tape 10 may have textile fibers 5 extending in various directions through the textile. In one example, textile tape 10 may be organized in a weft and a warp direction, interlaced with selected overlap angles. The warp textile fibers 5 extend lengthwise and generally align with the machine direction 50, as shown in FIG. 1. The weft textile fibers 5 may be placed at any angle to the lengthwise direction of the warp textile fibers 5. The angle of overlap between the warp and weft textile fibers 5 may be slight as for example when only two, if not several adjacent textile fibers are crossed. In various embodiments, the angle may be large as when one textile fiber is placed perpendicular to the general warp direction of the textile fibers 5 of the textile tape 10 and the perpendicular textile fiber 5 overlaps all or many of the textile fibers 5. Various angles may be used and are envisioned. Angles may include a large angle, comprising a "plain weave," a small angle, comprising a "satin," or a zero angle—a fabric having no interlacing. The angle may be selected based on various characteristics of the desired fabric such as frictional, mechanical, and heat transfer properties.

Textile fibers 5 may also be secured in their selected orientation by using a stitch bonding process similar to one used to prepare multi directional carbon fiber stitch bonded fabrics as is well known in the art. Such non-crimp fabrics may be, for example, manufactured on a machine derived from warp knitting technology. Stitches are generally made of a polymeric thread and may be burned off during a densification process of the preform. In various embodiments, stitches may be made of short fibers, plastics, staples, adhesives, or any other material capable of binding two or more fibers. Layers of fibers may be bonded with polymeric fibers or any form of a meltable web.

In an embodiment, and with reference to FIG. 1, the textile tape 10 is pulled along a textile tape support 60 towards cutting device 30 using conical rollers 40a, 40b. The textile tape support 60 may be any shape capable of supporting movement of the textile tape 10 while maintaining fiber orientation and flatness of the textile tape 10. In an embodiment, the textile tape support 60 has a substantially conical shape. The system 100 comprises an inlet conical roller 40a and a take-up conical roller 40b. The conical take-up roller 40b rotates and pulls the spiral tape over the surface of the conical textile tape support 60 in the direction of the tape movement 50.

Further, in accordance with an embodiment, an active transporting mechanism may be interposed between the textile tape support 60 and the textile to be cut. In various embodiments, the textile tape support 60 may be disposed in rotation to become an active component of the transporting mechanism 20. The transporting mechanism 20 may be designed to ensure an active transport of the textile and may provide additional features such as ensuring flatness of the textile against the curve of the textile tape support 60. The transporting mechanism 20 may be any mechanism which moves the textile tape 10 in a direction of the tape movement 50.

According to an embodiment, the transport mechanism 20 comprises a porous belt entrained by an additional motorized cone which makes contact with the upper portion of the textile tape support 60. The textile tape support 60 may be hollow and include a mesh opening in a region where a cutting device 30 is operated. Such a configuration allows for using a vacuum to provide local suction on the textile tape 10 to be cut and facilitate and/or ensure flatness of the textile tape 10.

For illustration purposes, a gantry 35 and cutting device 30 located on the gantry 35, are shown with the X axis parallel to the main axis of the textile tape support 60. The cutting device 30 may be mounted on the gantry 35 at an angle that is parallel to a top generatrix of the textile tape supporting cone 60. Such an arrangement minimizes movement of the cutting device 30. Coordination of the textile tape 10 and the transport speed along the Y direction and the linear speed of the cutting device 30 along the X axis allows control of the angle of the cut across the width of the tape. In an embodiment, the cutting device 30 may be mounted on a robot arm and controlled in any selected X, Y, or Z positions.

The textile tape support 60 may have any suitable shape to maintain the geometry of the helical tape and provide a substantially constant reference for defining the depth of the cut at the surface of the textile tape 10 as well as to support the movement of the textile tape 10 in a select direction. The textile tape support 60 may be configured to present the textile tape to the cutting device in a suitable manner. In an embodiment, the textile tape support 60 has a substantially conical shape to provide spatial positioning of the textile and maintain the shape of the spiral tape. Further refinements to the system may be added to ensure adequate flatness and positioning of the textile tape 10 surface with respect to the cutting device 30. Such refinements may include lateral guiding features and components to exert vertical forces on the fabric to ensure its flatness in the region where cutting is made.

For example, in an embodiment, one or more guide/press devices 65 are disposed above the textile tape support 60 to provide guidance and ensure flatness of the textile fabric as it is transported along the textile tape support 60. A porous fabric belt rotating around the surface of the textile tape supporting cone 60 may be interposed between the textile tape 10 and the textile tape supporting cone 60. An opening covered with a porous surface may be implemented along the top section of the textile tape supporting cone 60. A vacuum created inside the textile tape supporting cone 60 may pull the textile tape 10 against the textile tape support 60.

According to an embodiment, system 100 transports the textile tape 10 at a given position with respect to the position of cutting device 30. The cutting device 30 is any device or series of devices capable of cutting the textile tape 10. The cutting device 30 may be mounted on a gantry 35. The gantry 35 is any device or mechanism which allows the cutting device 30 to move along in one or more of the X, Y, and Z axes. The gantry 35 may allow a computer controlled positioning of the cutting device 30 along these axes. In an embodiment, the gantry 35 comprises a rail system with linear servomotors and motion control which disposes the cutting device 30. The gantry 35 may be oriented in a direction parallel to the top generatrix of the support cone 60 to minimize the movements of the cutting device 30.

Thus, both the textile tape support cone 60 and the gantry 35 may be disposed in all three planes and the relative distance and angle device 30 between them may be varied. As mentioned previously, for illustration purposes, the gantry 35 and the cutting device 30 are shown oriented parallel to the top generatrix of the textile tape support cone 60. However, the gantry 35 and the textile tape support cone 60 may be placed in various positions with respect to one another.

In an embodiment, the cutting device 30 includes a laser cutting head(s) (or laser(s)) capable of various cutting processes including cutting, kiss-cutting, scoring, and slitting. In various embodiments, a kiss-cutting technique may be used. In kiss-cutting, the beam of the laser 30 only cuts the fibers of a given fiber bundle or tow closer to the surface of the textile in sight of the laser beam and leaves the remaining bottom portion of the fiber bundle or tow in a substantially continuous form. In such a process, the cutting path, distance from the fabric, and power setting of the laser 30 may be selected to advantageously cut a top portion of selected fiber tows present at the surface of the textile tape 10.

Laser cutting provides precision and high speeds of cutting, typically between 250 and 1000 inches per minute, as well as reproducible cutting parameters, as lasers generally do not experience degradation due to wear such as that experienced by blades or cutting dyes. In one example, the laser 30 is a 100 W to 200 W laser mounted on a gantry 35 and in communication with a control system to guide the laser cutting. A carbon dioxide laser may be used. The carbon dioxide laser allows repeatable localized cuts at high speeds of several hundred inches per minute. In another example, a YAG laser is used.

In various embodiments, the cutting device 30 may be any cutting device operating with or without the assistance of a gantry 35. The cutting device 30 may comprise a blade, a cutting head or die, a different type of laser, a high definition plasma cutter or torch, a water jet, a hot gas plasma jet, or any other device capable of making cuts in a carbon textile tape 10. Such cutting devices may be suspended on the gantry 35 or they may operate with a robotic arm. For example, a plurality of stationary lasers may be utilized and pulsed to cut the textile fiber 10. In various embodiments, galvanometric laser technology may be utilized, wherein the laser is fixed and the beam is directed at selected locations with a movable mirror. The subsequent description will use the term laser and cutting device interchangeably, however it should be understood that the cutting device 30 may be any cutting apparatus as described above.

As the textile tape 10 is transported within a specified proximity of the gantry 35 and the laser 30, the laser 30 makes cuts in the textile tape 10. The proximity is defined by the focal length of the beam of the laser 30. The cuts may be made in any number of directions. In an embodiment, cuts are advantageously made in one or two directions corresponding to the two primary fiber orientations in the textile tape 10. The laser 30 may make a diagonal cut across the textile tape 10 as the textile tape 10 moves along the Y axis and the laser cuts across the X axis. In various embodiments, any cutting angles may be possible by shifting the orientation of the laser 30 on the gantry 35 in relation to the textile tape support cone 60 or vice versa. Other parameters that may be used to adjust the direction of the cut are respective linear speeds of the cutting device 30 and of the textile tape 10.

Generally, the laser 30 on the gantry 35 may be able to move in the X, Y, and Z axes. During cutting, the position of the laser 30 may be controlled along two axes while the textile tape 10 travels in the third axis. Different variations of orientations of the gantry 35 with the laser 30 and the position of the textile tape 10 are contemplated. Desired variations may depend on the angle of desired cut, the depth of a desired cut, the speed of movement of the textile tape 10, the speed of movement of the cutting device 30, the power of the laser 30, the focal length of the laser 30, the size of the beam, and various other parameters.

In an embodiment, both the X axis and the axis of the support cone 60 are set horizontally while the laser beam travels along the X and Z axes, while the textile tape 10 advances in the Y direction. In various embodiments, the top generatrix of the support 60 and the X axis of the gantry 35 are positioned parallel to one another. This configuration provides a constant distance between the fabric and the laser cutting head. For example, the laser 30 on the gantry 35 may be fixed in the Z axis only, thereby simplifying its movement and increasing accuracy of the cut.

The laser 30 may be configured to cut the surface of the textile tape 10 into shorter non-continuous fiber segments while maintaining the larger portion of the fiber substantially contiguous. In an embodiment, after the laser 30 cuts the textile tape 10, the textile tape 10 has a majority of the substantially continuous fibers in their original substantially continuous state and a selected amount of cut short segments of the textile fibers 5. In accordance with an embodiment, the laser 30 is set to cut any amount of short and/or long fiber segments so that the resulting fiber tape 10 may have several lengths of cut textile fibers 5. The length of the segments is selected to insure transport with the needle barbs and layer to layer connectivity. For example, z-fibers that are transported are at least twice as long as the penetration depth of needles, the z-fibers being at a minimum of approximately one inch. The cut segments are advantageously between about one and about four inches in length after they have been cut and the textile tape 10 is about four to about five inches in width. In an embodiment, the cut segments range upwards of about six inches in length after they have been cut, and textile segments longer than about six inches are considered long or substantially continuous textile fibers.

In accordance with various embodiments, the cut short segments and the textile tape may be used to make friction materials such as brakes. The length and width of the textile tape 10 and cut segments may be chosen to fit the parameters of the final brake material. Textile tape 10 advantageously remains handleable so that it may be pulled along the support cone 60 and retain sufficient strength to be later entrained by a needling device 70. In an embodiment, short textile fiber segments 5 are cut to be about one to about four inches in length. The laser 30 may make cuts all the way through the textile tape 10, or only cuts to a specific depth (kiss-cutting), or a combination of both types of cuts. The laser 30 may make the cuts rapidly and selectively, utilizing a very small beam spot size.

After the textile tape 10 is cut by the cutting device 30, the cut textile tape 10 may be stored for an indefinite amount of time before it is further utilized. The textile tape 10 is may be placed on a specifically designed spool that allows it to maintain its helical configuration without disturbing the orientation of the textile fiber segments 5. The textile tape 10 may be layered or generally placed in any other configuration that will allow it to be utilized at a later time. Whenever textile tape 10 is needed for use in fabricating a preform, the textile tape 10 is transported on at least one spool to a needling device 70 as indicated by the dotted lines in the textile tape 10. The textile tape 10, moving along the surface of the conical tape support 60 may comprise long and short strands of textile fibers 5 as described above. In various embodiments, the textile tape 10 may be transported directly from the assembly 100 to the needling device 70 using suitable feeding mechanisms, or the needling device 70, such as a needle-punch loom plate, may be operated in the same location as the cutting device 30.

As the textile fibers 5 enter the needling device 70, they are disposed in the geometrical configuration of a preform 80. A preform 80 is any shape that is formed after two or more layers of the textile tape 10 are superposed. The preform 80 may be partially formed by several layers of textile tape 10 and joined to one another by transporting a portion of textile fibers 5 in a z-direction. Various preforms 80 may be fully formed when all the necessary layers of textile tape 10 have been disposed and the layers have been interconnected by transporting a portion of textile fibers 5 in a z-direction. In an embodiment, the textile tape 10 is disposed in the selected annular preform configuration on the preform 80. This annular preform may be in the shape of a brake disk. In various embodiments, the preform 80 may comprise a rectangular block and may be prepared using a straight band of textile as the feed stock. Various other preforms can be created depending on the requirements and characteristics of the final shape.

When the textile tape 10 enters the needling device 70, the long and short textile fibers 5 of textile tape 10 become disposed as preform 80. An initial layer is disposed on a needle-punch loom bed plate with subsequent layers built upon the initial layer. The textile tape 10 may be placed and positioned in a preformed shape manually or by a mechanized device. The preform 80 may be any shape as desired for a final preform.

In an embodiment, where layers of textile tape 10 have already been placed into a preform 80, the next layer of textile tape 10 is placed directly on the partially formed preform 80. The textile tape 10 and the textile fibers 5 are advantageously positioned so that the edges of the textile tape are lined up. A portion of the short and discontinuous fibers are then transported in the z direction of the preform 80, which is the direction perpendicular to the length of the textile fibers 5 and perpendicular to the width of the textile tape 10. The textile fibers 5 need not be displaced only in the z-direction and at least several of the textile fibers 5 are preferably displaced in that direction to cross-link other textile tape 10 layers of the preform 80.

At least a portion of the free short fiber strands or discontinuous long fibers of in-plane textile fibers 5 are transported into the partially formed preform 80 in the z-direction with limited breakage, thereby interconnecting the individual layers of textile tape 10 of the partially formed preform 80. This needle punching technique increases the interlaminar shear strength of the final composite. In various embodiments, a percentage range of about 4% to about 10% for the ratio of z-fibers by weight is desired in a final preform. In one embodiment, it is advantageous to create about 5% to about 15% of short discontinuous fibers in the textile tape 10 prior to the needling stage. Further, according to an embodiment, a ratio range of about 11% to about 30% by weight of z-fibers is sought in the needled preform. In such an embodiment, about 12% to about 25% of short fibers may be created in the starting textile tape 10. Other ratios of z-fibers in the preform are possible and may be composed with suitable amounts of short fibers in the textile tape 10. Short fibers are generally those fibers that are less than six inches in length while discontinuous long or substantially continuous length textile fibers are those fibers greater than six inches in length.

Figure 2:
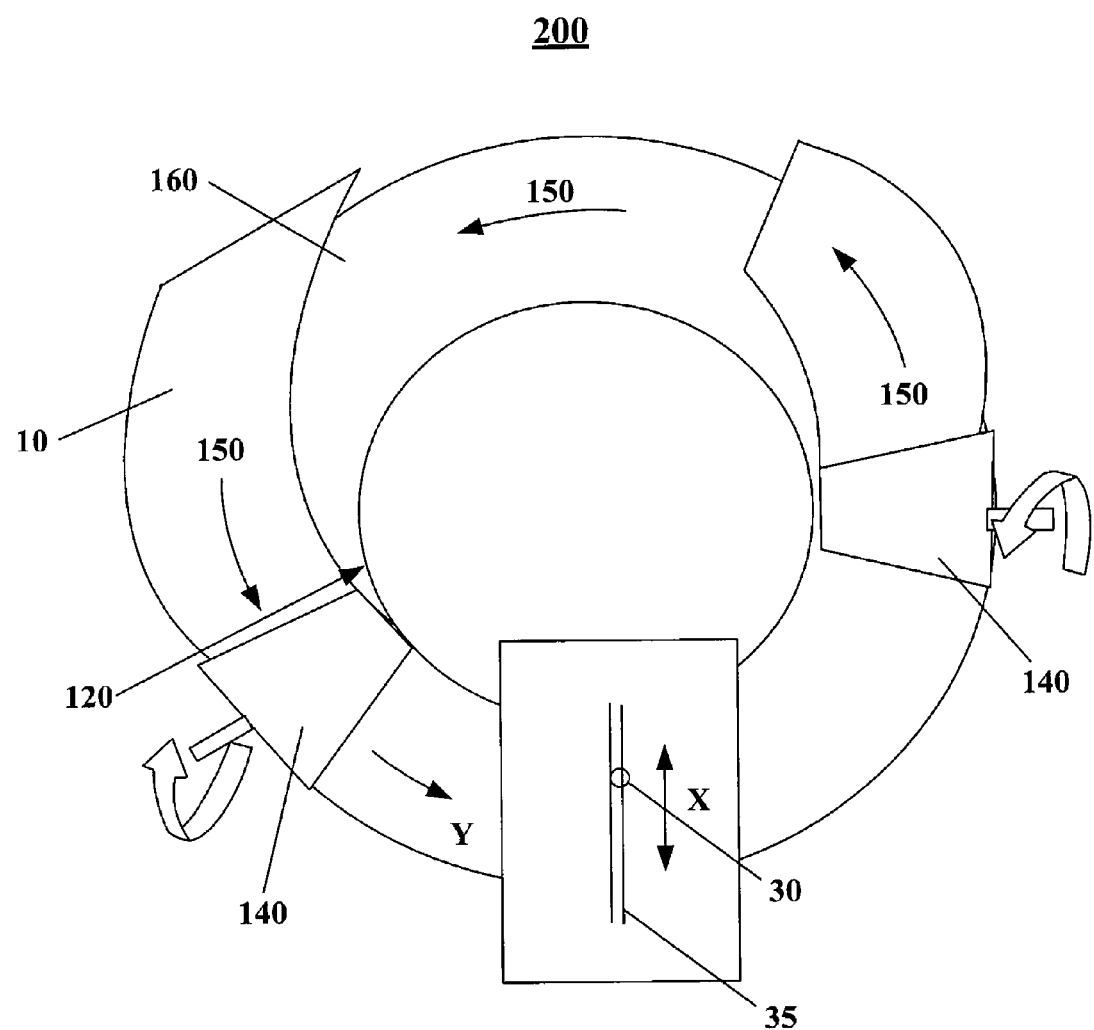
FIG. 2 illustrates a top view of a system for selectively cutting fiber segments prior to needling of a preform according to an embodiment.

FIG. 2 illustrates a top view of an embodiment for transporting feed stock textile under a cutting device for fabricating a preform. The system illustrated in FIG. 2 is a horizontal transport/cutting feeding textile system 200 for moving and positioning the textile tape 10 under the cutting device 30. The textile tape 10 is shown entering and exiting the horizontal textile system 200. The horizontal textile system 200 depicted here is in a circular formation. Other arrangements are possible including square, rectangular, and triangular systems. Additionally, a needle-loom bed plate may be a part of the system as well, whereby cutting and needling occur at the same location.

Textile tape 10 may be transported on a horizontal feeder 120 towards cutting device 30. In various embodiments, the cutting device 30 may be a laser, but may also be any of a number of cutting apparatuses as described above. The horizontal feeder 120 may be a stationary support such as a table. The feeder 120 includes horizontal rollers 140 which pull the textile tape 10 in a direction of movement shown by an arrow 150. The feeder 120 may be a rotating table or another rotating device which carries or pushes the textile tape 10 in the direction of movement 150. In an embodiment, one or more horizontal rollers 140 transport the tape over a stationary table. The horizontal rollers 140 may have a conical shape in this example. In various embodiments, a horizontal conveyor belt 160 may be used to transport the textile tape 10 in a direction of movement shown by an arrow 150. The horizontal conveyor belt 160 may be circular in shape.

The horizontal textile system 200 has similar functions to the conical textile system 100. Similarly to the system described earlier, several variations may be implemented for achieving the degree of orientation of the cutting device 30 with respect to the position of the moving textile tape 10. In an embodiment, the cutting device 30 may be mounted on a gantry 35 with three axes of movement. The cutting device 30 movements may be limited to two directions—the X and Z axis. The X axis of the gantry 35 is positioned parallel to the horizontal feeder 120 substantially at a ninety degree orientation with the horizontal feeder 120. The textile tape 10 moves along the Y axis towards the cutting device 30. In various embodiments, the cutting device 30 may be mounted so that it is free to move in only one axis and the textile tape 10 moves in the two other axes.

The cutting speed of the cutting device 30 depends on various factors including the thickness of the assembly of fibers to be cut, the characteristics of the fibers of the textile tape 10, the power of the cutting device 30, and the type of cutting apparatus. The transport speed of the textile tape 10 along the horizontal feeder 120 may be adjusted to advantageously correlate with the cutting speed of the cutting device 30. In an embodiment, the transport speed of the textile tape 10 is set as high as possible to derive maximum output, i.e. the maximum cutting speed for a selected cutting depth and an optimal direction and control of the cuts made by the cutting device 30 as the linear speed of the textile tape is maximized. An optimum cutting speed may be created by cutting the textile tape 10 diagonally through the full width of the textile tape 10 and performing a shallow cut on the upper surface of the textile tape 10 (kiss-cutting). In such an embodiment, the cutting device 30 may create a forty-five degree angle cut on the textile tape 10 when the cutting speed is substantially equal to the tape transport speed of the feeder 120. The angle between the direction of the cut and the line defined by the edge of the textile tape 10 may be varied to selectively cut textile fibers from a particular orientation with the textile tape 10. In an embodiment, the length of the textile fibers 5 is one to four inches and the width of the textile tape 10 is four to five inches. Other lengths and widths of textile fibers 5 and textile tape 10 may also be used depending on the required characteristics.

Figure 3:
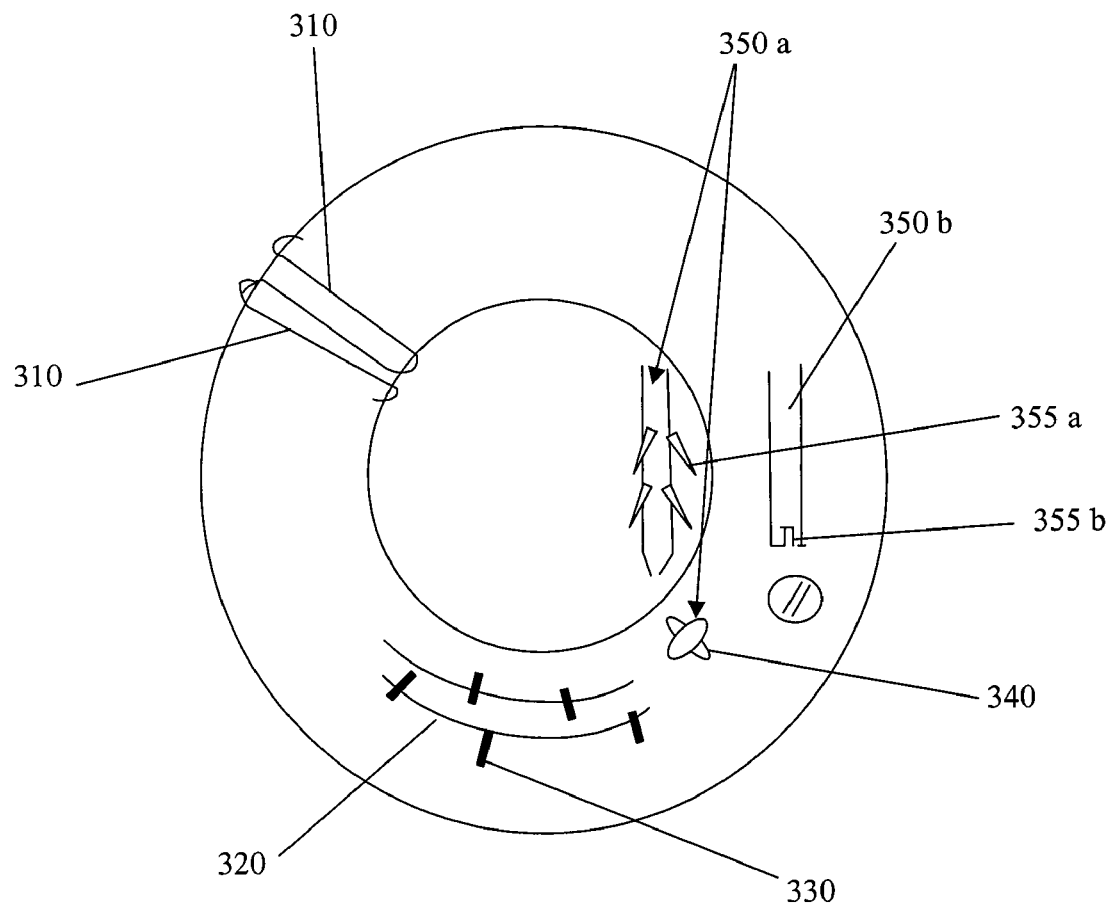
FIG. 3 illustrates a top view of an annular fibrous preform depicting fiber direction and fiber cuts showing an in-plane view of a needle aligned with the fiber cuts and directions of the preform according to an embodiment.

In accordance with an embodiment, FIG. 3 illustrates a top view of an annular preform 300 comprised of fibers selectively cut and transported from a given fiber orientation within the textile tape 10. FIG. 3 also shows two possible examples of needle geometry and orientation to accomplish selective z-transfer of circumferential fibers. The adapted needles 350 are also shown substantially at a ninety degree angle to the annular preform 300 as well as in a top view to make the radial surfaces of the needles readily apparent. One of the needles 350 is a fork needle 350b. The fork needle 350b is positioned in a needle board 90 such that the working part of the fork is parallel to the circumferential fibers within the textile tape 10. Similarly, a felt needle is equipped with two opposite edges bearing barbs and is termed a barb needle 350a. Barb needle 350a is oriented to selectively pick-up fiber elements oriented in a particular direction.

The number and orientation of cuts by the cutting device 30 may be optimized to align with particular characteristics of a final needled preform and to maximize manufacturing speed. For example, where the final needled preform will result in a carbon/carbon brake disk, it may be advantageous to maintain as many substantially continuous textile fibers 5 in the radial direction as possible. Radial fibers provide heat extraction and radial strength along the radial path during application of the brake disk. Preserving as much radial fiber as possible and selectively transferring in the z direction the fibers contained in the circumferential direction is accomplished by selectively cutting the fibers in the circumferential direction and positioning the working part of the needles accordingly.

According to an embodiment, FIG. 3 illustrates an annular preform 300. The completed annular preform 300 has a width that ranges from about three to about six inches. The annular preform 300 may be used as a brake disc and therefore advantageously has a maximum continuity of fibers in the radial direction. The annular preform 300 may contain textile fibers 10 oriented in two or more different directions. A first orientation for the textile fibers 10 may be in the radial direction shown by radial fibers 310. A second orientation may be in the circumferential direction shown by circumferential fibers 320. Both radial fibers 310 and circumferential fibers 320 may be present along all of the annular preform 300 homogenously or heterogeneously. Radial fibers 310 may be interlaced with circumferential fibers 320 or may be disposed in separate planes above or below the circumferential fibers 320.

The cutting device 30 is oriented in such a way as to cut the textile fibers 5 in the radial direction as illustrated by radial cuts 330. In an embodiment, the cutting device 30 of FIG. 2 is mounted on the gantry 35 at an angle with the line formed by the edge of the fabric to compensate for the movement of the textile tape 10 along the feeder 160. The angle may be any angle that compensates for the movement of the textile tape 10 to result in generally radial cuts. The radial fibers 310 thus maintain their radial continuity while the circumferential fibers 320 are cut by the cutting device 30.

Thus, the fiber tape 10, when placed on the bed plate of a needle punching loom 70, has radial fibers 310 oriented radially and circumferential fibers 320 oriented circumferentially. While a number of needles with multiple edges bearing barbs may be used, in an embodiment, a barbed needle 350a, or a fork needle 350b, is adapted to the orientations of the fibers 310 and 320. Barbed needles 350a or fork needles 350b are disposed in the needle board such that their working surfaces 355a, 355b are oriented to selectively transport fibers from the circumferential direction. In an embodiment, the barbed needle 350a is without barbs in the circumferential direction and the fork needle 350b does not have working surfaces in the radial direction.

During the needling process, the barbs of needles 350a are oriented perpendicular to the circumferential fibers 320 to advantageously transport a portion of the circumferential textile fiber segments 320 without displacement of the radial fibers 310. In movement towards the textile tape 10, the barbs intercept the fibers oriented in the direction perpendicular to their position and thus advantageously transport the fiber segments oriented in the circumferential direction of the preform. In an embodiment where there are no barbs oriented in the circumferential direction, the adapted needle does not displace the radial fibers 310. The two edge needles may be replaced with a needle presenting only one edge with barbs. Similarly, the fork needle 350b, correctly oriented, provides a similar function.

Modification of the position of the barbs 340 relative to the orientation of the textile fibers 5 within the preform 80 being built may present a mechanism to vary the characteristics of the inner and outer region of a preform 80 for a textile feed stock with a constant set of properties. A difference in wear and structural properties of the preform may arise as a result. Altering the position of the barbs 340 may vary the construction of the preform 80 along its various layers. In an embodiment, using a textile tape tow with constant properties and varying barb positions allows the central "core" portion of the final preform 80 to have different properties than the outside "wear face" portion. In various embodiments, each layer of preform 80 may have different characteristics, depending on the positioning of the utilized barbs 340 of the needles 350.

This method may be applied to numerous configurations and fiber compositions. In various embodiments, cuts may be made in a straight fabric to build hollow cylindrical preforms from which disks may be cut. Various types of fibers may be used including OPF, PAN, pitch, carbon fibers or other suitable materials. OPF fibers may be cut mechanically rather than with a laser. In various embodiments, preforms may be made for non-brake applications and the orientation of cuts on the fiber preform may be adjusted to fit the specific application. For example, various bodies of revolution such as hollow conical preforms may be fabricated.

FIG. 4 illustrates a top view of an embodiment of textile tape configuration for fabricating a rectangular needled preform. Textile fibers 5 within the textile tape 10 are oriented in a warp direction as indicated by a warp direction arrow 450. The warp direction 450 is a direction parallel to the general orientation of the textile tape 10. The textile fibers 5 are also interlaced through a weaving process in a weft direction as indicated by the weft direction arrow 460 and the shaded block weft segments 430. Textile fibers 5 are bound by fibers of any suitable material in a generally transverse direction. The generally transverse direction of weft may be completely perpendicular to the warp direction or be at an angle other than ninety degrees so long as there is transverse overlap between the warp direction 450 and the weft direction 460.

Figure 7:
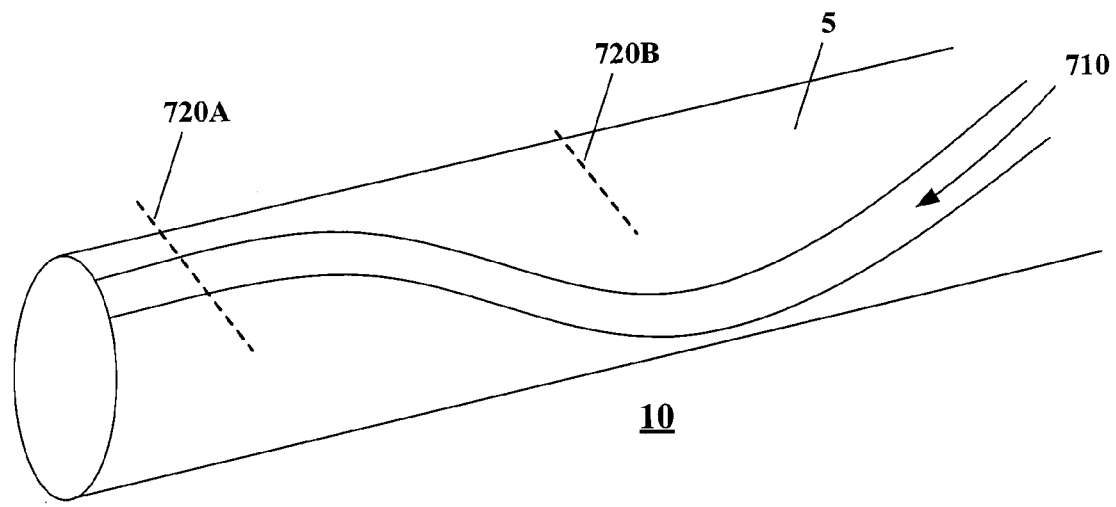
FIG. 7 illustrates an angled view of a single carbon fiber tow with lightly twisted fibers according to an embodiment.

Construction of the fabric may be tailored or selected to enhance preferential cutting in a chosen fiber orientation. Sections of a substantially continuous fiber within a tow may occupy different planes due to the type of fabric construction and the construction of the tow, resulting in different types of cuts. For instance, woven fabrics (as shown in FIG. 4) are typically interlaced, causing a shift of the fibers in different planes. The degree of natural or tailored twist within a starting tow or a twist within a bundle may also shift some of the fibers into different planes (as shown in FIG. 7).

Figure 10A:
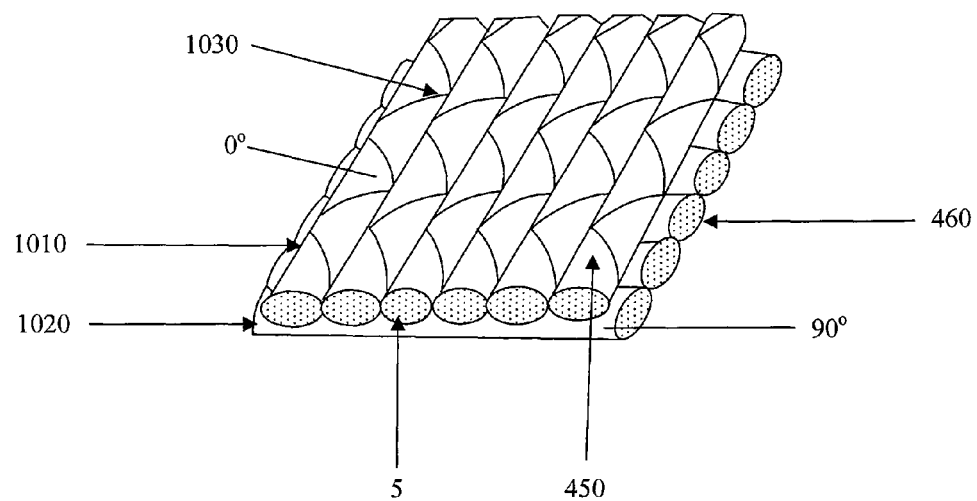
FIGS. 10a and 10b illustrate particular forms of stitch-bonded and non-crimped carbon fabric according to various embodiments.
Figure 10B:
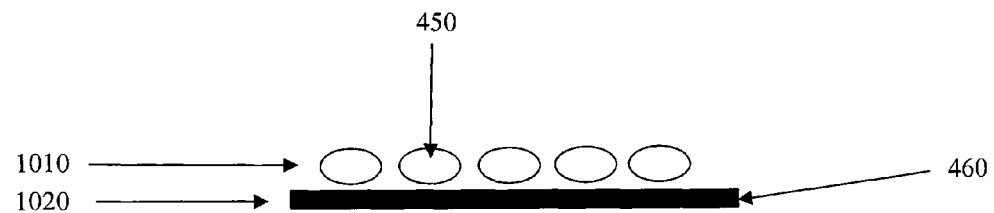

Along with woven fabrics (as shown in FIG. 4), non-crimped and stitch-bonded fabrics may be used as the substantially continuous feed textile as well. These fabrics are prepared by techniques derived from warp knitting technology and allow for the placement of the warp and weft tows in distinct planes. This fabric construction provides maximum flexibility for selecting a given fiber orientation for cutting segment fibers. FIGS. 10a and 10b represent an embodiment of stitch-bonded and non-crimped fabric from a top and cross-sectional view, respectively. FIGS. 10a and 10b display a stitch-bonded fabric where a first distinct plane 1010 of textile fibers 5 within the textile tape is oriented in the warp direction 450. A second distinct plane 1020 of textile fibers is located underneath the first distinct plane 1010 and is oriented in the weft direction 460, substantially at a ninety degree angle to the warp direction. Additional planes of textile fibers are possible, but are not shown in the figures for simplicity. Each distinct plane is stitch-bonded together by stitch fibers 1030.

In the case of a woven fabric, there are a number of construction parameters that may be selected to affect the location, continuity, and amount of fibers floating at the surface of the fabric. A weave style may be selected to have large lengths of floating tows at the surface exposed to the cutting device 30. However, textile fibers 5 that are not perfectly parallel in the textile tape 10 and interwoven in the weft direction 460 may be in different planes. These textile fibers 5 may be cut differently than perfectly parallel carbon fibers. The cutting device 30 may not cut all the way through a portion of a textile fiber 5 that does not lay completely parallel to the top surface of the textile. Such textile fiber 5 may only get cut on one end (as shown in FIG. 7). Between two cuts performed along the same tow within a textile tape 10, there may thus be two types of cut textile fibers 5. First, there may be an amount of short textile fibers 5 having two free ends. Second, there may be an amount of long textile fibers 5 having only one free end also described as discontinuous long fibers. Either cut textile fiber 5 that has at least one free end, however, may be transported in the z-direction during needling.

In various embodiments where textile fibers 5 are interlaced or interwoven, the path of the cutting device 30 may be purposefully adjusted to cut at an angle which follows a pattern of weave architecture such as a twill, as shown in FIG. 4 by the diagonal cut lines 440. Twill is a known weave pattern that may be used to produce a particular type of fabric. For example, as shown in FIG. 4, eight parallel segments of textile fibers may be present and oriented in the warp direction 450, denoted as warp segment 420. A transverse textile segment, oriented in the weft direction 460, denoted as weft segment 430, is woven into the eight warp segments 420. The weave pattern that is created by weaving the weft segment 430 into warp segments 420 is denoted as a twill. In this example, one weft segment 430 is placed above the first warp segment 420, then woven underneath the next two sequential warp segments 420 and once again above the fourth sequential segment. This creates a one-by-two twill as can be seen in FIG. 4 by the ratio of dark blocks of weft 430 to light areas of warp 420. Various other twill patterns are possible and may be selected including two-by-two, one-by-three, or three-by-three. The angular cut 440 may be adjusted to align with the angle of the twill pattern allowing a preferential cutting of portions of tows oriented in the warp direction.

Cutting along lines parallel to the twill angle of an uneven twill pattern and crossing the warps may be advantageous as the laser 30 cuts the warp segments 420 located at the surface of the textile but does not cut the limited amount of floating weft segments 430. Thus, selecting cutting paths along twill lines crossing the floating warp segments 420 presents a continuity of the warp tows to be cut. In an embodiment, cutting along the twill lines crossing the floating weft segments 430 also presents a continuity along a diagonal. However, with the selected uneven twill, there may be less exposed surface when cutting along these paths. Similar to the radial fibers 310 and circumferential fibers 320 of FIG. 3, this allows selective cutting of the warp tows 420 for a better final performance of the preform 80. In various embodiments, cutting in only one direction may allow increased cutting speed of the cutting device 30.

Figure 5:
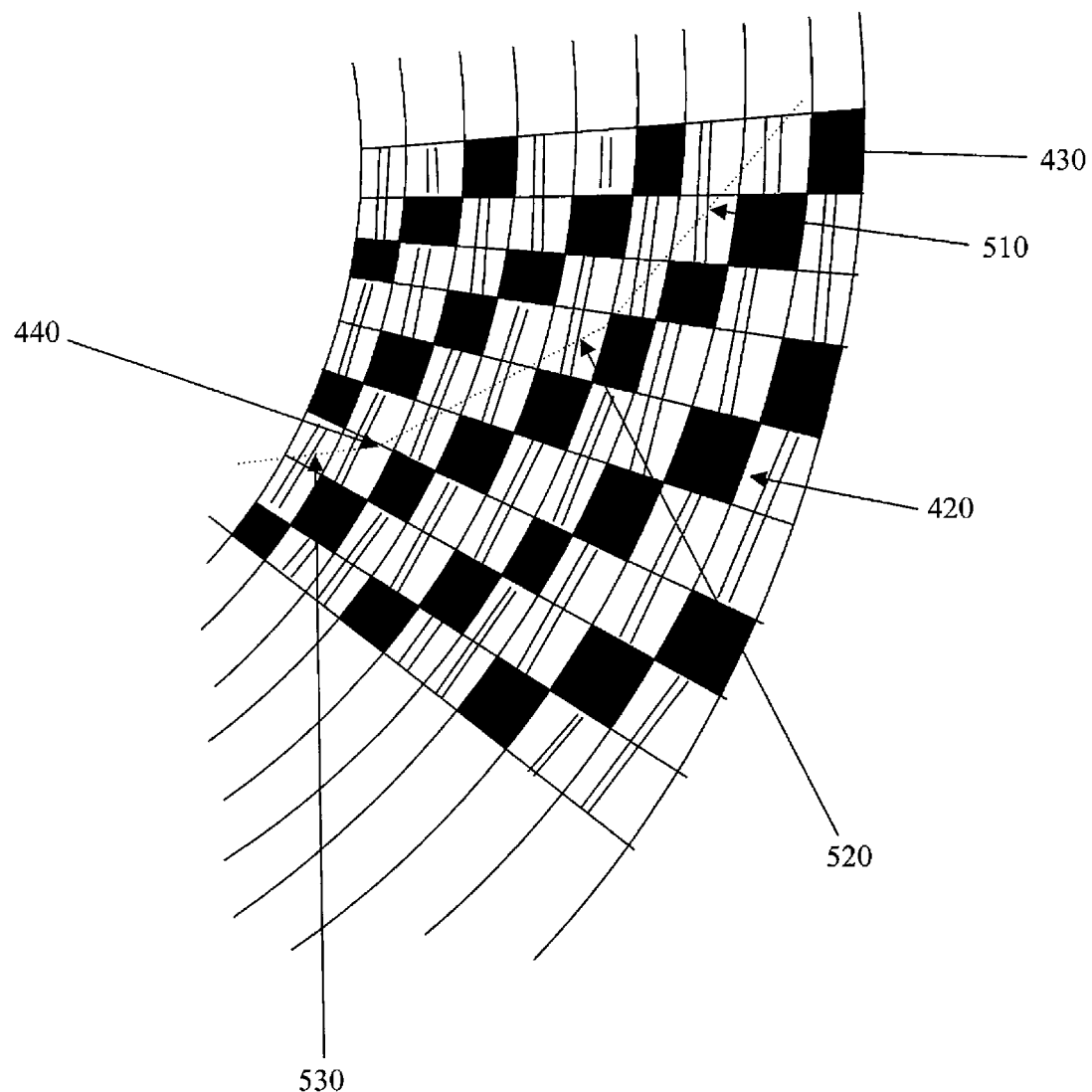
FIG. 5 illustrates a top view of a section of a spiral fiber tape with depicted segmented cut lines according to an embodiment.

FIG. 5 illustrates a similar twill construction as illustrated in FIG. 4 with textile fiber 10 in a helical configuration for fabricating an annular preform. It is to be noted that, as throughout the rest of this specification, like numbers between FIG. 4 and FIG. 5 refer to the same elements. For example, the double lines 420 in FIG. 5 are the warp lines 420 in FIG. 4. Similarly, the dark blocks 430 correspond to the dark weft blocks in FIG. 4.

Figure 6A:
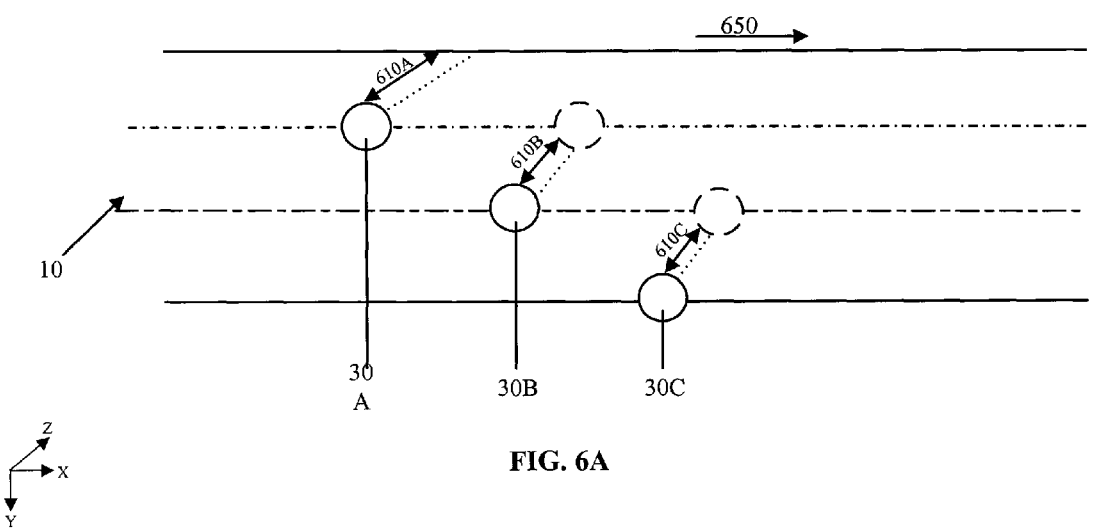
FIGS. 6a and 6b illustrate top views of a cutting system with multiple cutting devices for selectively cutting fiber segments in a feeding textile according to an embodiment.
Figure 6B:
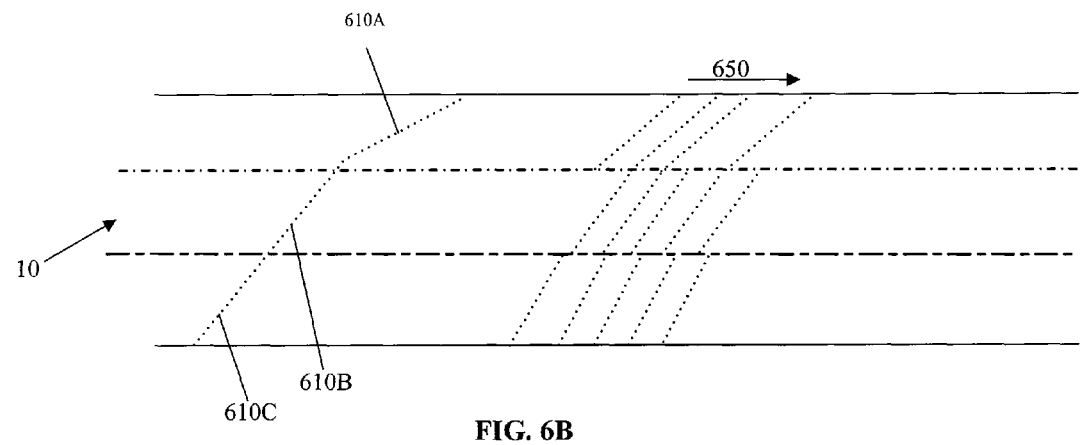

FIGS. 5 and 6A and 6B illustrate cutting paths on a helical fiber tape that may be achieved by a programmed path of a cutting device 30 or by several cutting devices 30. FIG. 5 shows a textile tape 10 and a cut line 440 extending along the twill direction of the fiber tape 10. The cut line 440 is illustrated by the dotted line. In the case of a helical tape construction, the twill pattern may not be organized in a straight line. In an embodiment, a path traveling along the surface of warp textile fibers 5 may be arrived at by combining several diagonal paths. The cut line 440 in FIG. 5 shows such a cutting path along the surface of a helical textile tape.

According to an embodiment, the fiber tape 10 comprises a substantially continuous helical textile fiber that is cut generally in the radial direction by the cutting device 30. The cutting device 30 may be programmed so as to make several cuts in diagonal segments according to the local twill direction of the fiber tape 10. The cutting device first cuts along the first diagonal 510, then along the second diagonal 520, and lastly along the third diagonal 530. The number of diagonals possible is not limited and may be adjusted based on the twill, cutting speed, textile feeding speed, desired depth cut, and other factors. The approximate diagonal of cut line 440 appears curved on FIG. 5 because it is composed of several cut lines 510, 520, 530 which follow the local direction of the twill pattern.

Following the direction of the twill pattern with the cutting device 30 may be accomplished in several ways. In an embodiment, the angle of the twill pattern is predetermined and the cutting device 30 is programmed to follow the predetermined angle or series of angles of the twill. Further, in accordance with an embodiment, a feedback system is installed on the cutting device 30. The feedback system may be accompanied by a "vision mechanism" that is able to digitally recognize patterns on the textile tape 10. The feedback system with the vision mechanism tracks the fabric pattern and provides inputs to the automated gantry 35 for adjusting the path of the cutting device 30. Several cutting devices 30 may by operated in tandem to increase the speed of the cutting operation. Each cutting device 30 may be spaced appropriately to follow similar cutting paths.

In accordance with various embodiments, and with reference to FIGS. 6A and 6B, multiple cutting devices 30 may be directed to cut designated portions of the textile tape 10. FIG. 6A shows multiple cutting devices 30A, 30B, 30C and their cutting paths 610A, 610B, 610C, respectively, along the textile tape 10. FIG. 6B illustrates one example of the textile tape 10 after it has been cut by the cutting devices 30A, 30B, 30C.

As illustrated in FIG. 6A, the textile tape 10 moves in the direction of movement 650. In this example, several cutting devices 30A, 30B, and 30C are disposed along the path of movement of the textile tape 10. More or fewer cutting devices 30 may be used depending on the required parameters.

For a given speed of the textile tape 10, cutting devices 30A, 30B and 30C may be set to move and cut at different linear speeds along the X and Y axes to yield the paths indicated by arrows 610A, 610B, 610C, respectively. Linear speeds of the cutting devices are set according to the length of each path. Where the gantry 35 is parallel to the surface of the textile fabric, the cutting devices 30 are free to move along the X axis. Each cutting device 30 travels at a selected speed so that the various individual cut paths 610A, 610B, 610C are completed at substantially the same time. In an embodiment, cutting devices 30A, 30B, and 30C have changing linear speeds at various radiuses of the textile tape 10. The speed of travel of textile tape 10 in the X direction is set as needed. The speed of movement of cutting devices 30 in the Z direction may be substantially the same for the three cutting devices 30A, 30B, 30C, but may also be varied as required.

As the textile tape 10 moves in the direction of movement 650, cutting devices 30A, 30B, and 30C, cut at different portions of the fiber tape 10 resulting in a full cut across the width of the textile tape 10. In an embodiment, the cuts 610A, 610B, 610C across the tape 10 are administered diagonally with the cut 610A at forty five degrees and cuts 610B and 610C are placed at decreasing angles. In various embodiments, the cuts 610A, 610B, 610C may be made at any angle across the tape, including being made transversely.

In various embodiments, for example, as shown in FIG. 6B, the several cuts 610A, 610B, 610C of the cutting devices 30A, 30B, 30C may coalesce with one another thereby providing a seemingly unitary cut across the fiber tape 10 as is shown by the continuous line 610A, 610B, 610C. In an embodiment, the cuts 610A, 610B, and 610C do not coalesce with one another, but instead create a series of non-connected cuts across the textile tape 10 as is shown by the separate cut lines 610A, 610B, 610C in FIG. 6B. As such, FIG. 5 may illustrate a cutting path of a single programmed cutting device 30, or several cutting devices 30A, 30B, and 30C working in tandem.

FIG. 7 illustrates an angled view of a single strand of fiber with a light amount of twist. As is explained above, the textile tape 10 may have been purposefully prepared with a lightly twisted textile fiber tow. In an embodiment, the tow may present a portion of textile fibers 5 misaligned with a majority of parallel textile fibers 5 within the tow. This misalignment may result in a section of textile fibers 5 residing in various planes along the length of the fibers. These textile fibers 5 are shown with a twist in the direction of twist 710. When textile fibers 5 within the textile tape 10 are twisted or partially misaligned and are subsequently cut by the cutting device 30, they may yield segments of textile fibers 5 cut on both ends or a bundle of textile fibers 5 with only one end cut. This inconsistent cutting may occur where the cut does not go through the whole thickness of the tow within the fiber tape 10 as shown by partial cut lines 720A and 720B.

Cut 720A cuts partially across a bundle of fibers 5 and thus partially across the surface of the helical textile tape 10. However, cut 720B, though cutting across the surface of the helical textile tape 10, does not cut the same group of fibers 5. Instead, cut 720B cuts through another group of textile fibers 5 in the bundle of fiber tape 10. Thus, depending on the degree of twisting of the tow only one end of a given group of fibers 5 may be cut, thus creating a group of long discontinuous fibers. It should be remembered that the given group of fibers 5 will be cut at another end eventually. However for current purposes, this particular textile fiber 5 group is considered to be cut at only one end because the length of the textile fiber 5 is longer than the distance between adjacent cuts. In an embodiment, textile fiber 5 that is uncut for longer than six inches is considered to be cut at only one end.

Selectively preparing textile tape 10 with twisted tows in the radial direction facilitates imparting a twist in the textile fibers 5 that are oriented in a radial direction and allows further control of the amount of radial fibers 5 cut at both ends. Radial textile fibers 5 that are twisted may have less cut fiber textile segments than circumferential fibers which are not twisted. Selective twist for one direction of textile fibers 5, but not for another direction of textile fibers 5, may be another way to selectively control directional cutting.

Twist may be measured in the number of turns that a textile fiber or group of textile fibers 5 make due to their twist per unit length. A twist is the amount of turns of one end of a textile fiber for a specified length of textile fiber 5. For example a group of one inch fibers that are fixed on one end but are free on another end may be twisted a quarter of a turn. In this example the twist is one quarter turn per inch or more simply, one-fourth. Various other twists are possible including one-eighth, one-sixteenth, and one-half. The twist 710 may be imparted into the fiber bundle 5 prior to manufacturing the fiber tape 10.

Figure 8:
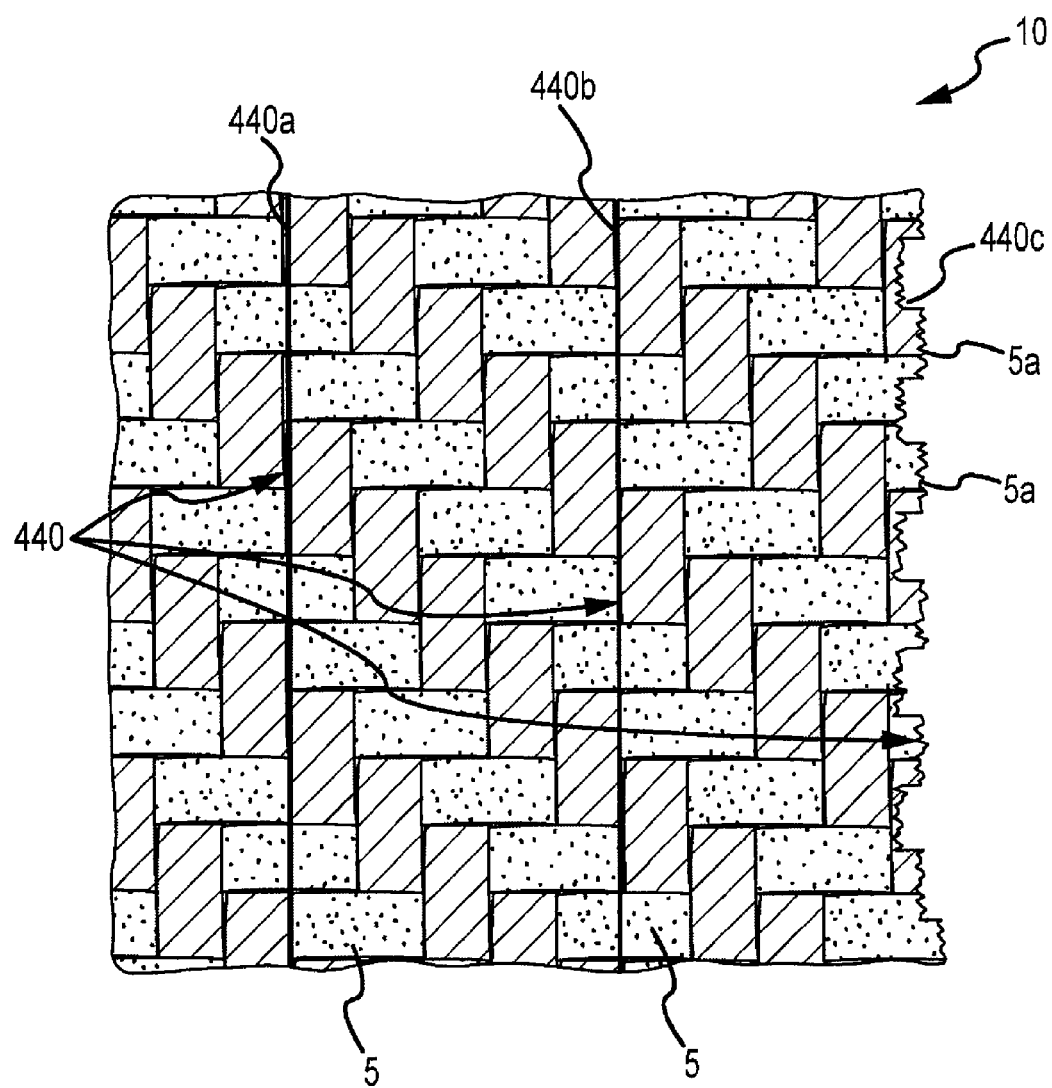
FIG. 8 illustrates a woven carbon fabric that has been selectively cut according to an embodiment.
Figure 9:
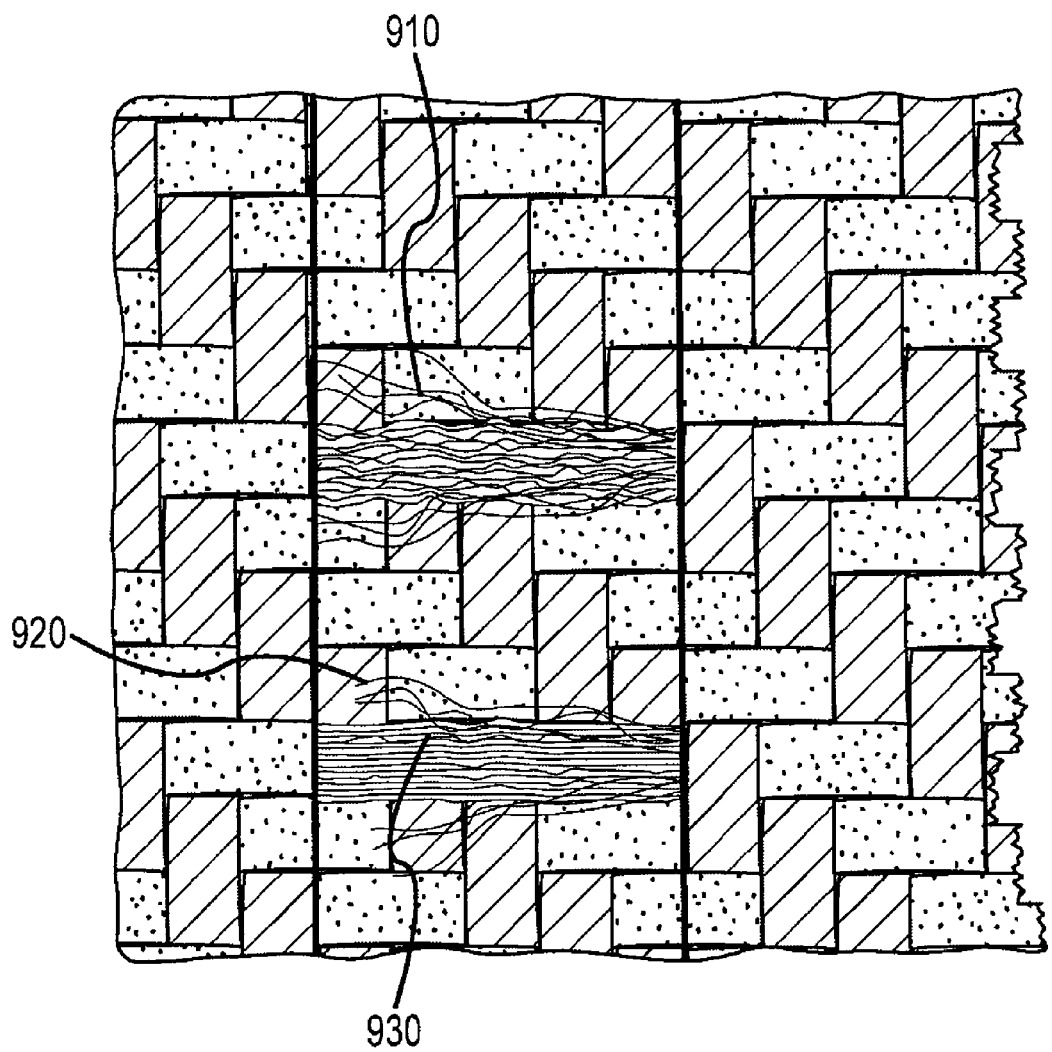
FIG. 9 illustrates a woven carbon fabric that has been selectively cut and the fibers removed for illustration, according to an embodiment.

FIGS. 8 and 9 illustrate an embodiment of a textile fiber fabric that has been cut by a cutting device in a carbon feeding textile. FIG. 8 shows the top view of a single layer of textile tape fabric with three visible cut lines 440. FIG. 9 shows segments of fibers that have been removed from the textile fabric. FIG. 8 shows the textile tape fabric folded along a third cut line 440C to illustrate the partial cut through the thickness of textile tape fabric. The textile tape 10 has been cut by a cutting device 30 along cut lines 440A 440B and 440C. The cuts along cut lines 440A, 440B, 440C are partial thickness cuts as explained previously. One of the layers of the textile tape 10 has been folded back at a partial cut line 440C to illustrate the cut textile fibers 5. The partial cuts at lines 440A, 440B, and 440C are cuts through some of the textile fibers 5, but not all. This partial cutting allows the textile tape 10 to remain cohesive during transport and handling of the textile tape 10.

FIG. 8 shows the end textile fibers 5a present along the cut line 440C where the fiber tape 10 has been folded back. The end textile fibers 5a illustrate some of the cut, non-continuous textile fibers 5 that are present at and/or or proximate to cut line 440C, where the textile tape has been folded. These cut fibers 5a may be of two types. A first type, as shown in FIG. 9, may be short length cut fibers 910. For illustration purposes, one section of cut fibers has been removed from the woven fabric by manually cutting through the interlacing tows. These fibers include short length fibers which have had two ends cut over the distance between two cut lines and are short in length as described above. A second type of cut fibers may be discontinuous long fibers 920 that have been cut by the cutting device 30, but were only cut at one end due to the mis-orientation with the remaining fibers in tow, thus conserving a long substantially continuous nature with one free end. Textile fibers 5, on the other hand, remain uncut and folded back with the substantially continuous portion of textile tape 10. These uncut fibers 930 are shown in FIG. 9 following manual removal of the tows which would normally be interlaced in that section.

In an embodiment as illustrated in FIGS. 8 and 9, a Carbon Dioxide F201 laser 30 is used to produce the cuts 440A, 440B, 440C. In this embodiment, the laser 30 is powered at about 100 W or about 200 W. Light and heavy carbon fiber tow sizes of about 12,000 to about 50,000 textile fibers 5 may be used and may be cut with the same precision. Other larger or smaller tow sizes may be utilized as well. Textile fibers 5 and the layers of textile tape 10 may be a non-crimp fabric that is stitch-bonded to maintain overall cohesiveness. In various embodiments, textile tape 10 may be of a helical construction and may be composed of interlaced textile fibers 5. The woven or stitch bonded helical textile tape 10 may be transported horizontally in a circle (as shown in FIG. 2) while the cutting head of laser 30 may be moved along the x, y, or z axes. The laser 30 may be set to fixed conditions including a focal length of about 2.5 inches, a spot size of about 0.004 inches, and a depth of about 0.07 inches to kiss-cut the layers of textile tape 10. The laser 30 may also be set to variable settings including a cutting speed of about 250, 500, or 1000 inches per minute. For example, kiss cutting provides clean cuts 440 in textile tape 10 under all of the above listed conditions. The number of textile fibers 5 that are cut within a single layer of the fiber tape 10 may vary with the cutting speed.

Light and heavy carbon fiber tow sizes may be used to fabricate fiber tape 10 of various areas and sizes. For example, a single layer of textile tape 10 having about 50,000 textile fibers 5 within a tow may be manufactured with about 900 grams of fiber per meter squared. In such a single layer of textile tape 10, the textile fiber 5 tow may have a width of about 0.30 inches and a thickness of about 0.02 inches. A single layer textile tape 10 prepared with about 12,000 textile fibers 5 may be prepared with a targeted 430 grams of fiber per meter squared and have a tow displaying a width of about 0.1 inches and a thickness of about 0.01 inches.

Cutting conditions according to various embodiments yield different results of percentage of short fibers and discontinuous long fibers within the textile tape 10. In one example, the layered textile tape 10 having about 50,000 textile fibers 5 and weighing about 900 grams per meter squared is cut by a laser 30 having a power setting of about 100 W and a cutting speed of about 500 inches per minute. These cuts may yield a ratio of between about 9% and about 12% of short fibers. In an embodiment, the same type textile tape 10 may be cut by a laser 30 at about 200 W and about 250 inches per minute yielding percentage of short fibers between about 10% and about 13% by weight. A layered textile tape 10 having about 12,000 textile fibers 5 and an average weight of about 430 grams per meter squared may yield a percentage of about 30% short fibers when cut by a laser 30 at about 200 W and a cutting speed of about 500 inches per minute. Various other speeds, textile tape constructions, power settings, and other characteristics are contemplated.

Not all of the depicted components may be required, however, and some implementations may include additional components not shown in the figures. Variations in the arrangement and type of the components may be made without departing from the spirit or scope of the claims as set forth herein. Additional, different or fewer components may be provided.

The illustrations described herein are intended to provide a general understanding of the structure of various embodiments. The illustrations are not intended to serve as a complete description of all of the elements and features of apparatus, devices, and systems that utilize the structures or methods described herein. Various embodiments may be apparent to those of skill in the art upon reviewing the disclosure. Embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed examples require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other examples, which fall within the true spirit and scope of the description. Thus, to the maximum extent allowed by law, the scope is to be determined by the broadest permissible interpretation of the following claims and their equivalents, and shall not be restricted or limited by the foregoing detailed description.

Although the invention has been shown and described with respect to certain embodiments, equivalents and modifications will occur to others who are skilled in the art upon reading and understanding of the specification. Various embodiments include all such equivalents and modifications, and are limited only by the scope of the following claims.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for preparing a needled preform comprising:
    transporting a textile tape, wherein the textile tape comprises substantially continuous textile fibers, the textile tape being defined by a width and a thickness;
    cutting through at least one of:
        a portion of the width of the textile tape, and
        a portion of the thickness of the textile tape,
            wherein the textile tape remains substantially contiguous after the cutting; and
    needling the textile tape into the needled preform after the cutting.

2. The method of claim 1, wherein the cutting occurs at least one of before, after, and while the textile tape is moving along a textile transport of a needle loom.

3. The method of claim 1, wherein the textile tape comprises at least one of: oxidized polyacrylonitrile fibers, carbonized polyacrylonitrile fibers, stabilized pitch fibers, ceramic precursor fibers, or substantially pure carbon fibers.

4. The method of claim 1, wherein the cutting occurs across an entirety of the width and only a portion of the thickness.

5. The method of claim 1, wherein the cutting occurs across an entirety of the thickness and only a portion of the width.

6. The method of claim 1, wherein both the cutting of the textile tape and the needling of the textile tape occur in a needle-loom bed plate.

7. The method of claim 1, wherein the cutting comprises utilizing a cutting device, wherein the cutting device physically contacts the textile tape.

8. The method of claim 1, wherein the cutting comprises utilizing a cutting device, wherein the cutting device includes a laser.

9. The method of claim 8, wherein the textile tape is transported circularly in a horizontal plane and the laser is displaced in a plane different from the horizontal plane.

10. The method of claim 1, wherein the substantially continuous textile fibers are interconnected by at least one of interlacing and stitching.

11. The method of claim 1, wherein the substantially continuous textile fibers further comprise a predetermined degree of twist between the substantially continuous textile fibers in a specific direction.

12. The method of claim 1, wherein the cutting comprises at least one of:
    selecting a fiber orientation to enhance composite properties of the textile tape; and
    selecting a plurality of cuts across a fiber orientation within the textile tape to enhance properties of a composite.

13. The method of claim 12, wherein the cutting comprises utilizing a cutting device, wherein the cutting device cuts diagonally across the textile tape as the textile tape travels along a first axis while the cutting device moves across a second axis perpendicular to the first axis.

14. The method of claim 1, further comprising selecting a fabric architecture of the textile tape to preferentially cut predetermined fibers.

15. A method for enabling z-fiber transfer in a textile tape comprising:
    transporting the textile tape, wherein the textile tape comprises substantially continuous textile fibers, wherein the textile tape is formed of substantially pure carbon fibers, the textile tape being defined by a width and a thickness;
    cutting through at least one of:
        a portion of the width of the textile tape, and
        a portion of the thickness of the textile tape,
            wherein the textile tape remains substantially contiguous after the cutting; and
    needling the textile tape having fiber segments into a needled preform, wherein the needling comprises utilizing needles having working surfaces oriented to transfer fiber segments from a first fiber orientation into a z-direction.

16. A system for enabling z-fiber transfer in a textile tape comprising:
    a textile support configured to transport the textile tape, wherein the textile tape comprises a plurality of substantially continuous fibers, the textile tape being defined by a width and a thickness;
    a cutting device configured to cut through at least one of:
        a portion of the width of the textile tape, and
        a portion of the thickness of the textile tape,
    wherein the textile tape remains substantially contiguous after the cutting; and
    a needling device configured to needle the textile tape into a needled preform after the cutting device cuts the textile tape.

17. The system of claim 16, further comprising a feedback system configured to recognize patterns on the textile tape and generate a cutting path for the cutting device to follow.

18. The system of claim 16, wherein the textile tape comprises greater than or equal to about 90 wt % carbon.

19. The system of claim 16, wherein a percentage of weight of fiber segments to an overall weight of the textile tape is between about 5% and about 35%.

20. The system of claim 16, wherein the needling device comprises needles having working surfaces oriented in a direction to transfer fiber segments from a selected fiber orientation into a z-direction.

* * * * *